United States Patent
Mitsui et al.

(10) Patent No.: US 9,978,538 B2
(45) Date of Patent: May 22, 2018

(54) POWER SUPPLY SWITCH, POWER FEEDING CIRCUIT AND ELECTRIC CONNECTION BOX

(71) Applicant: Yazaki Corporation, Tokyo (JP)

(72) Inventors: Takahiko Mitsui, Makinohara (JP); Tatsuya Tsubouchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 397 days.

(21) Appl. No.: 14/747,544

(22) Filed: Jun. 23, 2015

(65) Prior Publication Data
US 2015/0380191 A1    Dec. 31, 2015

(30) Foreign Application Priority Data

Jun. 25, 2014   (JP) ................................. 2014-129852

(51) Int. Cl.
*B60R 16/033* (2006.01)
*H01H 47/00* (2006.01)
(Continued)

(52) U.S. Cl.
CPC ............. *H01H 1/42* (2013.01); *B60R 16/033* (2013.01); *H01H 1/365* (2013.01); *H01H 47/00* (2013.01);
(Continued)

(58) Field of Classification Search
CPC ....... B60R 16/02; B60R 16/03; B60R 16/033; H01H 1/42; H01H 1/365; H01H 47/00;
(Continued)

(56) References Cited

U.S. PATENT DOCUMENTS

| 5,936,317 A * | 8/1999 | Sasanouchi | .......... H02J 7/0031 307/10.1 |
|---|---|---|---|
| 8,130,070 B2 | 3/2012 | Shibata | |

(Continued)

FOREIGN PATENT DOCUMENTS

| CN | 101399140 A | 4/2009 |
|---|---|---|
| CN | 101578679 A | 11/2009 |

(Continued)

OTHER PUBLICATIONS

Communication dated Jan. 4, 2017, issued by the State Intellectual Property Office of the People's Republic of China in counterpart Chinese Patent Application No. 201510358033.8.

(Continued)

*Primary Examiner* — Levi Gannon
(74) *Attorney, Agent, or Firm* — Sughrue Mion, PLLC

(57) ABSTRACT

In a power supply switch which switches plural paths for supply of power from a power source to connected states or disconnected states by fixed contacts provided on the plural paths and a movable contact, the fixed contacts includes a power-source-side fixed contact which connects to the power source, an electricity-storage-element-side fixed contact which connects to an electricity storage element, and an another path side fixed contact which connects to power supply destinations via a another path which are provided so as to be separate from and independent of each other. When the power supply switch is switched to disconnected states, the electricity storage path and the another path are disconnected from each other and a current flow from the electricity storage element to the another path is thereby shut off.

8 Claims, 11 Drawing Sheets

(51) Int. Cl.
  *H01H 85/12* (2006.01)
  *H01H 1/42* (2006.01)
  *H01H 1/36* (2006.01)
  *H01H 85/20* (2006.01)
  *H01H 85/055* (2006.01)
  *H02G 3/16* (2006.01)

(52) U.S. Cl.
  CPC ..... *H01H 85/12* (2013.01); *H01H 2085/0555* (2013.01); *H01H 2085/208* (2013.01); *H02G 3/16* (2013.01)

(58) Field of Classification Search
  CPC ........... H01H 85/12; H01H 2085/0555; H01H 2085/208; H02B 1/46; H02B 1/48
  USPC ......................................................... 307/139
  See application file for complete search history.

(56) References Cited

U.S. PATENT DOCUMENTS

| | | | |
|---|---|---|---|
| 9,118,169 | B2 | 8/2015 | Takahashi |
| 2009/0088026 | A1 | 4/2009 | Furuya et al. |
| 2011/0001352 | A1* | 1/2011 | Tamura ................. B60R 16/033 307/9.1 |
| 2011/0095859 | A1 | 4/2011 | Shibata |
| 2013/0015941 | A1 | 1/2013 | Nakamura et al. |
| 2013/0154356 | A1* | 6/2013 | Nakajima ............. B60R 16/033 307/9.1 |
| 2013/0229752 | A1 | 9/2013 | Takahashi |
| 2014/0081520 | A1 | 3/2014 | Sugimoto |

FOREIGN PATENT DOCUMENTS

| | | |
|---|---|---|
| CN | 103303217 A | 9/2013 |
| JP | 2013-020849 A | 1/2013 |
| JP | 2013028295 A | 2/2013 |

OTHER PUBLICATIONS

Communication issued by the State Intellectual Property Office of P.R. China dated Sep. 1, 2017 in counterpart Chinese Patent Application No. 201510358033.8.
Notification of Reasons for Refusal, dated Mar. 22, 2018, issued in corresponding JP Application No. 2014-129852, 6 pages in English and Japanese.

* cited by examiner

PRIOR ART

POWER SUPPLY SWITCH, POWER FEEDING CIRCUIT AND ELECTRIC CONNECTION BOX

CROSS REFERENCE TO RELATED APPLICATION

This application is based on Japanese Patent Application (No. 2014-129852) filed on Jun. 25, 2014, the contents of which are incorporated herein by reference.

BACKGROUND OF THE INVENTION

1. Technical Field

The present invention relates to a power supply switch for switching, to connected states or disconnected states, plural paths for supply of power from a power source as well as to a power feeding circuit and an electric connection box having the power supply switch.

2. Background Art

Conventionally, in automobiles, even while they are switched off (i.e., the ignition switch is off), to keep a clock etc. functional, it is necessary to cause faint currents (what is called dark currents) to flow from a power source such as a battery. Therefore, in automobiles, batteries may suffer overdischarge due to dark currents in cases that delivery from a manufacturing factory to a sales store takes long time (e.g., export from Japan to a foreign country).

To prevent such battery overdischarge due to dark currents, a technique of shutting off dark currents by removing a fuse provided between a battery and power supply destinations such as a clock that are irrelevant to running of the automobile has been proposed.

For example, JP-A-2013-20849 discloses a fuse having a fuse holder which functions as a power supply switch for switching, to connected states or disconnected states, plural paths for supply of power from a power source.

However, the above power supply switch is associated with the following problem. As shown in FIG. 11, in the case where plural paths R1, R2, and R3 include a path R1 that connects to an electricity storage element C such as a capacitor, even if a power source B is disconnected from the plural paths R1, R2, and R3 by the power supply switch S, dark currents still flow from the electricity storage element C along the paths other than the path R1, that is, the paths R2 and R3.

SUMMARY OF THE INVENTION

The present invention has been made in view of the above, and an object of the invention is therefore to provide a power supply switch, a power feeding circuit, and an electric connection box that can reduce a power loss due to dark currents.

To attain the object by solving the above-described problem, a power supply switch according to a first mode of the invention includes fixed contacts provided on plural paths for supply of power from a power source; and a movable contact which switches the plural paths to a connected state or a disconnected state, wherein at least one of the plural paths is an electricity storage path which connects to an electricity storage element which stores power; the fixed contacts include a power-source-side fixed contact which connects to the power source, an electricity-storage-element-side fixed contact which connects to the electricity storage element, and an another path side fixed contact which connects to an another path of the plural paths, and the power-source-side fixed contact, the electricity-storage-element-side fixed contact, and the another path side fixed contact are provided so as to be separate from and independent to each other and the another path is different from the electricity storage path; and when the plural paths are switched to the disconnected state by the movable contact, the electricity storage path and the another path are disconnected from each other and a current flow from the electricity storage element to the another path is thereby shut off.

In a power supply switch according to a second mode of the invention, for example, the power-source-side fixed contact is provided downstream of a branching point of the electricity storage path and the another path; the power-source-side fixed contact includes a first power-source-side fixed contact provided on the electricity storage path; and a second power-source-side fixed contact provided on the another path; and the movable contact includes a first movable contact which connects or disconnects the first power-source-side fixed contact and the electricity-storage-element-side fixed contact to or from each other; and a second movable contact which connects or disconnects the second power-source-side fixed contact and the another path side fixed contact to or from each other.

In a power supply switch according to a third mode of the invention, for example, the first movable contact and the second movable contact are provided in a single switch manipulation body.

In a power supply switch according to a fourth mode of the invention, for example, the power-source-side fixed contact, the electricity-storage-element-side fixed contact, and the another path side fixed contact are provided in a concentrated manner at a branching point of the electricity storage path and the another path; the movable contact is a single movable contact; and the single movable contact connects or disconnects the power-source-side fixed contact, the electricity-storage-element-side fixed contact, and the another path side fixed contact to or from each other.

In a power supply switch according to a fifth mode of the invention, for example, the power-source-side fixed contact, the electricity-storage-element-side fixed contact, and the another path side fixed contact are aligned in a line; and the movable contact has a straight shape.

To attain the object by solving the above-described problem, for example, a power feeding circuit according to a sixth mode of the invention comprises the power supply switch according to any one of the first to fifth modes of the invention and switches plural paths for supply of power from a power source to connected states or disconnected states.

To attain the object by solving the above-described problem, for example, an electric connection box according to a seventh mode of the invention incorporates the power supply switch according to any one of the first to fifth modes of the invention and distributes power from a power source to plural power supply destinations.

To attain the object by solving the above-described problem, for example, an electric connection box according to an eighth mode of the invention incorporates the power feeding circuit according to the sixth mode of the invention and distributes the power from the power source to plural power supply destinations.

When switched to disconnected states, the power supply switch according to the first mode of the invention can shut off current flows from the power source to the plural paths, respectively. Furthermore, since the electricity storage path and the another path are disconnected from each other to shut off a current flow from the electricity storage element to the another path, a power loss due to dark currents can be reduced.

When the first movable contact and the second movable contact are switched to disconnected states, the power supply switch according to the second mode of the invention can shut off current flows from the power source to the plural paths, respectively. Furthermore, since the electricity storage path and the another path are disconnected from each other to shut off a current flow from the electricity storage element to the another path, a power loss due to dark currents can be reduced.

The power supply switch according to the third mode of the invention in which the first movable contact and the second movable contact are provided in the single switch manipulation body can facilitates a switching manipulation on the power supply switch because the single switch manipulation body can perform, simultaneously, switching of the electricity storage path to a connected state or a disconnected state by means of the first power-source-side fixed contact, the electricity-storage-element-side fixed contact, and the first movable contact and switching of the another path to a connected state or a disconnected state by means of the second power-source-side fixed contact, the another path side fixed contact, and the second movable contact.

In the power supply switch according to the fourth mode of the invention, since the single switch manipulation body can render the electricity storage path and the another path into connected states or disconnected states simultaneously, a switching manipulation on the power supply switch can be performed easily. Furthermore, the power-source-side fixed contact, the electricity-storage-element-side fixed contact, and the another path side fixed contact can be arranged in a concentrated manner, the power supply switch can be miniaturized.

In the power supply switch according to the fifth mode of the invention, the power-source-side fixed contact, the electricity-storage-element-side fixed contact, and the another path side fixed contact are aligned straightly, whereby the movable contact is made straight and hence can be connected to all of these three contacts. Thus, the power supply switch is given a simple structure.

When the power supply switch is switched to disconnected states, the power feeding circuit according to the sixth mode of the invention can shut off current flows from the power source to the plural paths, respectively. Furthermore, since the electricity storage path and the another path are disconnected from each other to shut off a current flow from the electricity storage element to the another path, a power loss due to dark currents can be reduced.

Incorporating any of the above-described power supply switches, the electric connection box according to the seventh mode of the invention can provide the same advantages as those power supply switches.

Incorporating the above-described power feeding circuit, the electric connection box according to the eighth mode of the invention can provide the same advantages as the power feeding circuit.

MODES FOR CARRYING OUT THE INVENTION

Power supply switches, power feeding circuits, and electric connection boxes according to preferred embodiments of the present invention will be hereinafter described in detail with reference to the drawings.

Embodiment 1

Figure 1:
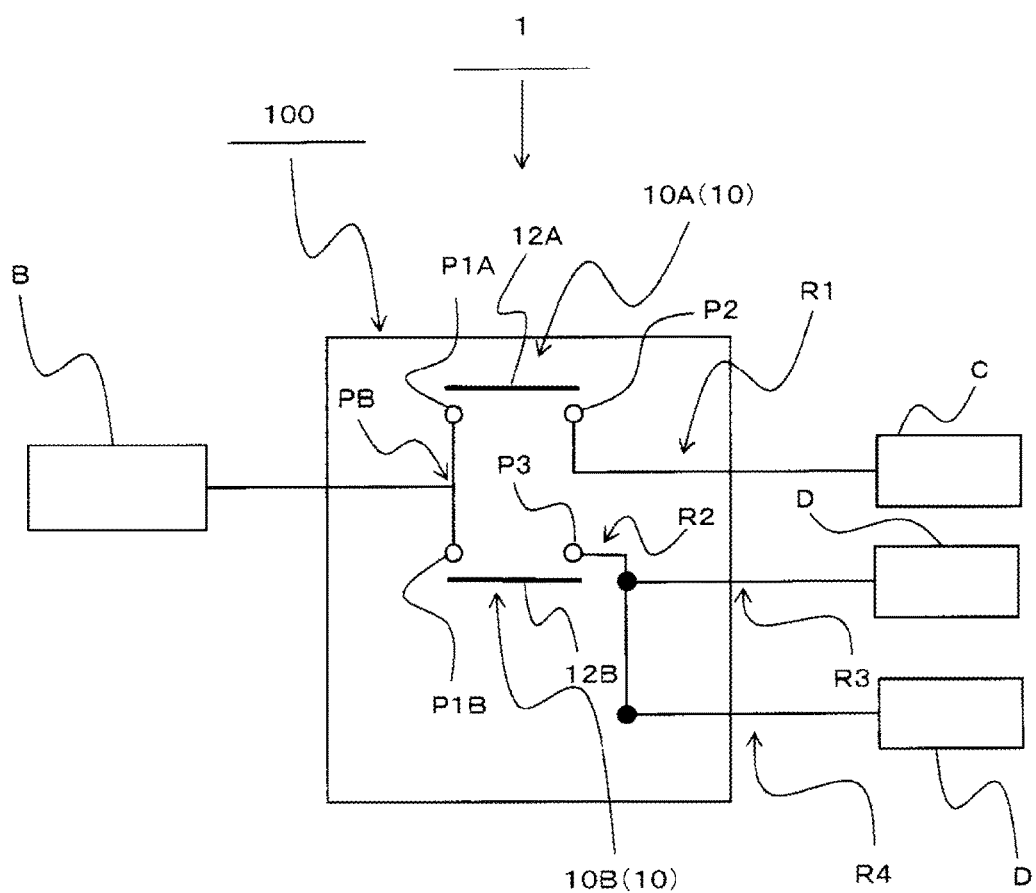
FIG. 1 illustrates a circuit diagram of a power feeding circuit having power supply switches according to a first embodiment of the present invention, power supply destinations, and an electric connection box incorporating the power feeding circuit.
Figure 2:
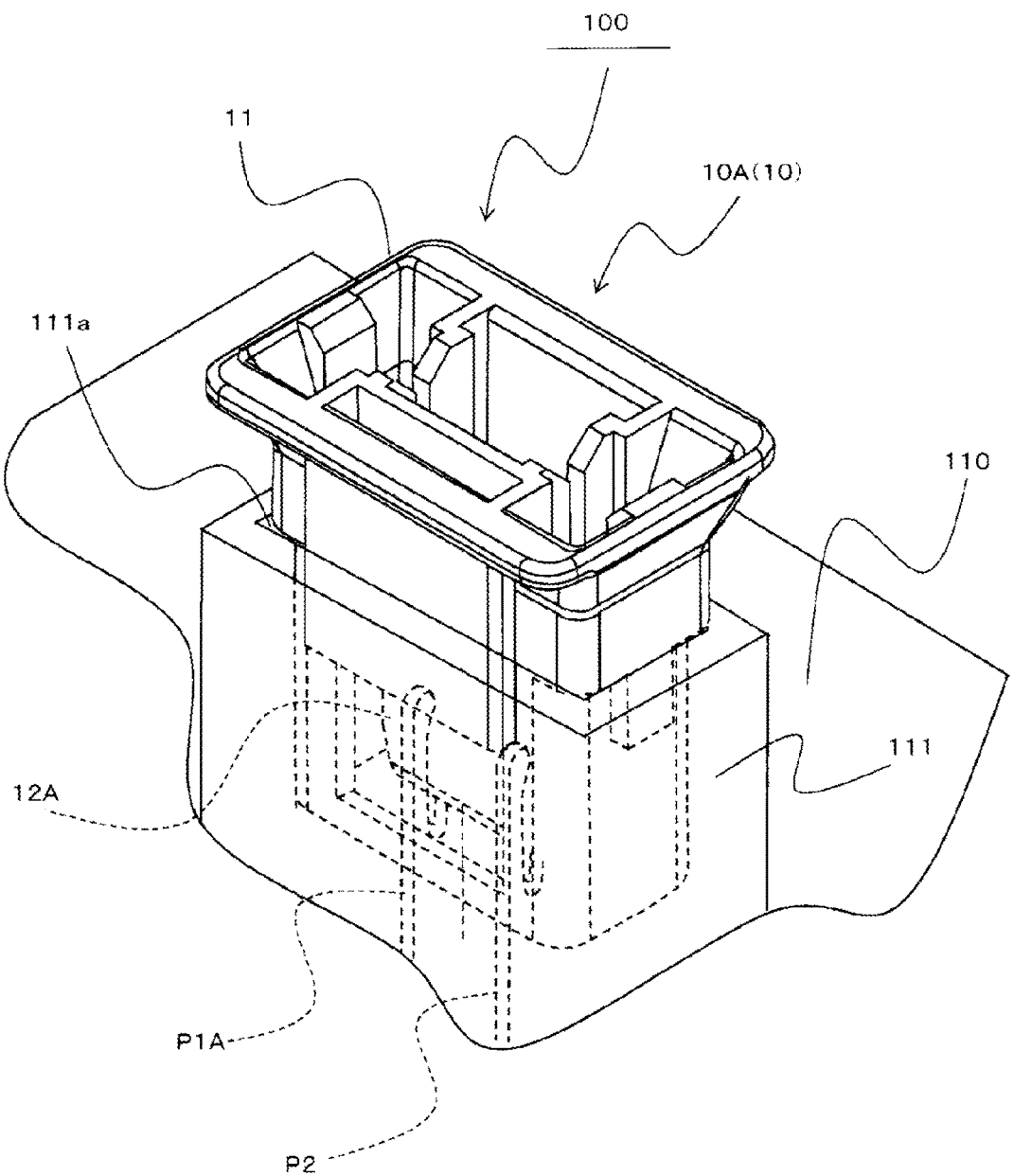
FIG. 2 is an enlarged perspective view of one power supply switch of the electric connection box shown in FIG. 1 and its neighborhood in which the power supply switch is switched to a connected state.
Figure 3:
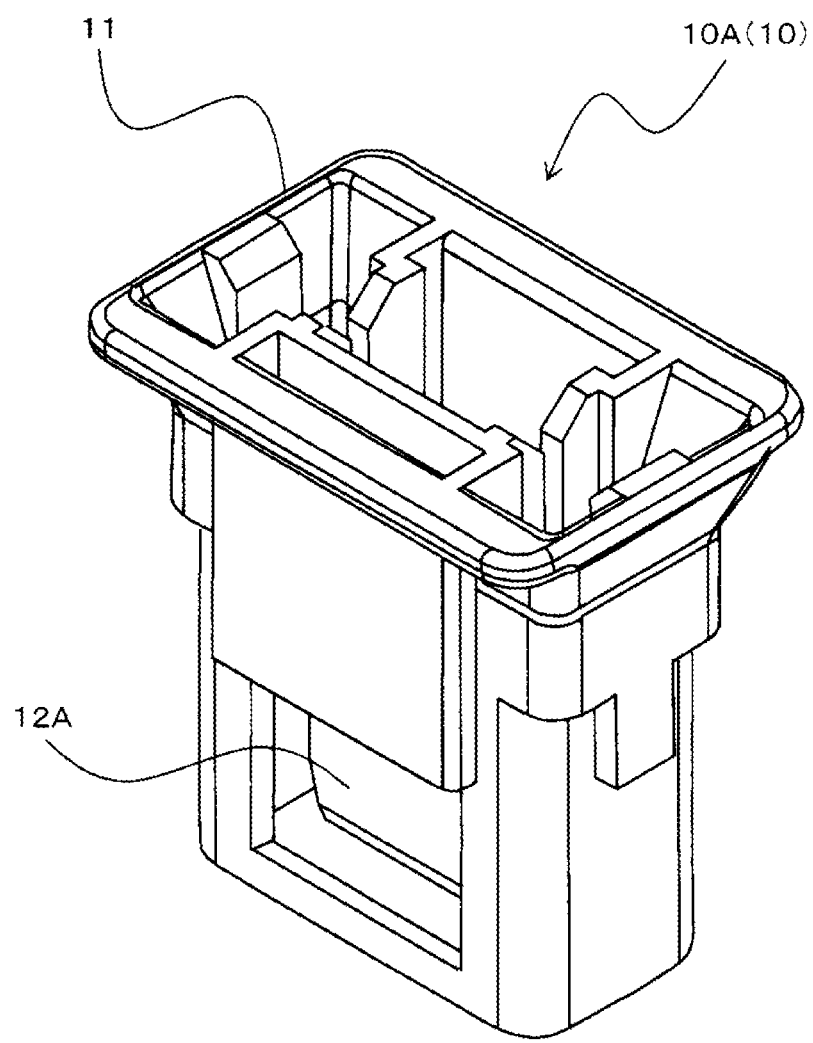
FIG. 3 is a perspective view of a switch manipulation body incorporating a first movable contact.
Figure 4:
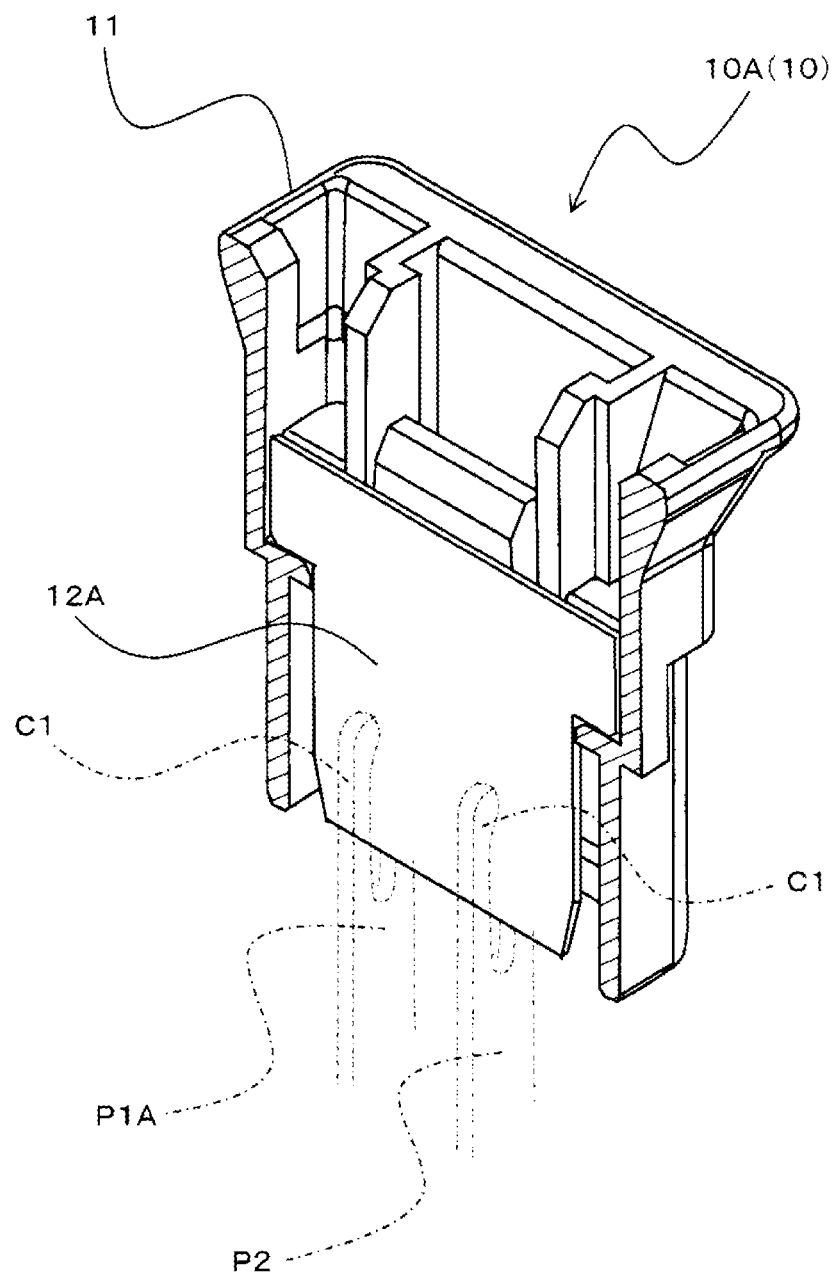
FIG. 4 is a sectional view of the switch manipulation body shown in FIG. 3 in which a power-source-side fixed contact and an electricity-storage-element-side fixed contact are indicated by imaginary lines.
Figure 5:
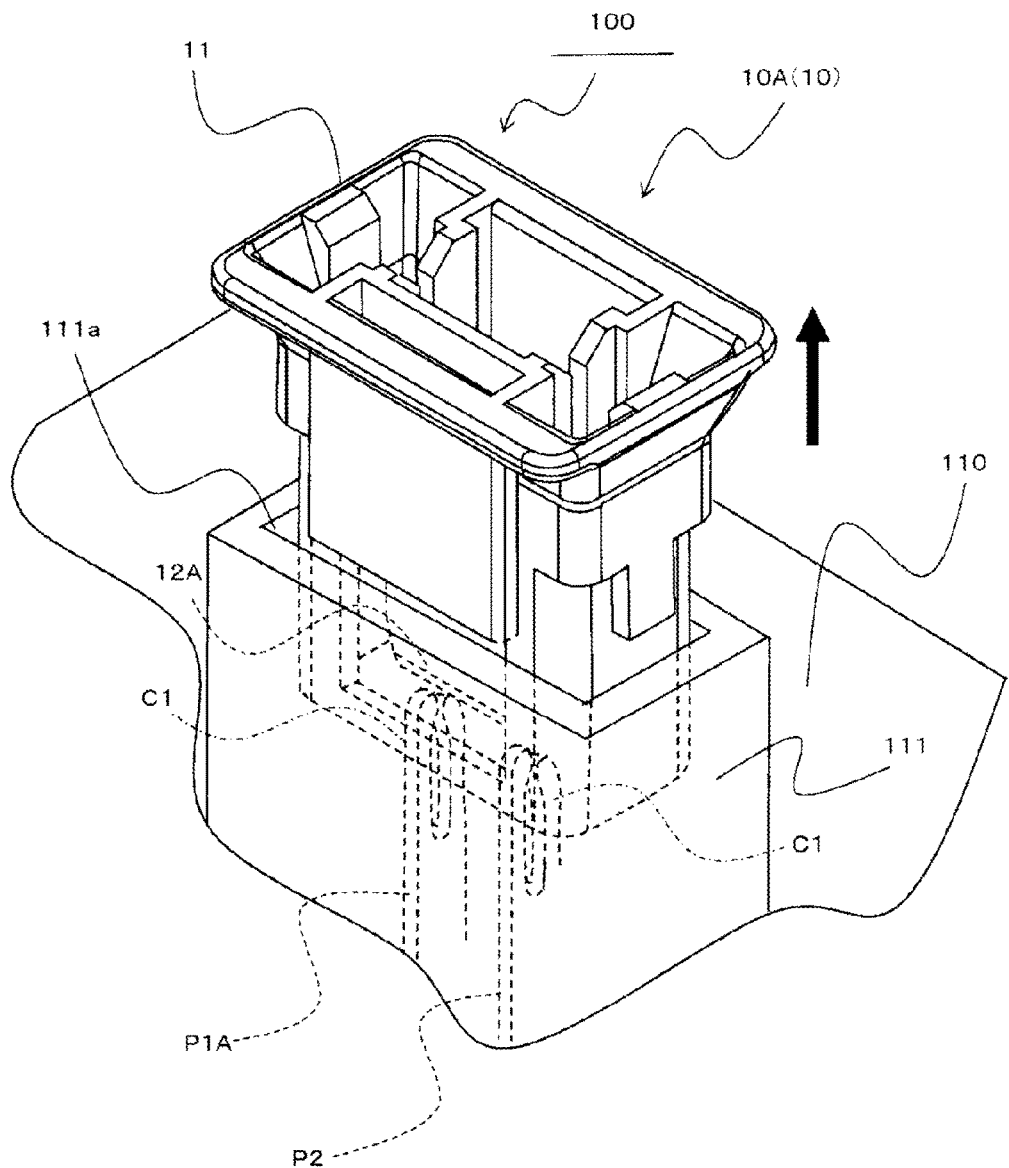
FIG. 5 is an enlarged perspective view of the power supply switch of the electric connection box shown in FIG. 1 and its neighborhood in which the power supply switch is switched to a disconnected state.

FIG. 1 includes a circuit diagram of a power feeding circuit 1 having power supply switches 10A and 10B according to a first embodiment of the invention and schematically shows power supply destinations D and an electric connection box 100 incorporating the power feeding circuit 1. FIG. 2 is an enlarged perspective view of the power supply switch 10A of the electric connection box 100 shown in FIG. 1 and its neighborhood in which the power supply switch 10A is switched to a connected state. FIG. 3 is a perspective view of a switch manipulation body 11 incorporating a first movable contact 12A. FIG. 4 is a sectional view of the switch manipulation body 11 shown in FIG. 3 in which a power-source-side fixed contact P1 and an electricity-storage-element-side fixed contact P2 are indicated by imaginary lines. FIG. 5 is an enlarged perspective view of the power supply switch 10A of the electric connection box 100 shown in FIG. 1 and its neighborhood in which the power supply switch 10A is switched to a disconnected state.

The power feeding circuit 1 according to the first embodiment of the invention is incorporated in the electric connection box 100 for distributing power from a power source B to the plural power supply destinations D. Installed in, for example, an automobile, the electric connection box 100 distributes power from the power source B such as a battery to plural electric devices (power supply destinations D) such as a clock.

The power feeding circuit 1 has a power supply switch 10 for switching plural paths R1 and R2 for supply of power from the power source B such as a battery to connected states or a disconnected states. (In the following, an action of switching the path R1 or R2 to a connected state or a disconnected state by means of the power supply switch 10 may be expressed simply as "to connect" or "to disconnect.")

The power feeding circuit 1 has the plural paths R1 and R2 for supply of power from the power source B, and one of the plural paths R1 and R2 is an electricity storage path R1 that connects to an electricity storage element C which serves for power storage. The electricity storage element C is implemented as a capacitor.

On the other hand, the path R2 (hereinafter referred to as an another path R2) which is different from the electricity storage path R1 connects to various power supply destinations D such as a clock.

The electricity storage path R1 and the another path R2 branch off at a branching point PB which is located downstream of the power source B. The first power supply switch 10A and the second power supply switch 10B are disposed on the electricity storage path R1 and the another path R2, respectively.

Of the fixed contacts of the first power supply switch 10A, a first power-source-side fixed contact P1A which is a contact connected to the power source B and an electricity-storage-element-side fixed contact P2 which is a contact connected to the electricity storage element C are provided on the electricity storage path R1.

The another path R2 connects to the two power supply destinations D. That is, the another path R2 branches off downstream of the second power supply switch 10B into a first path R3 and a second path R4.

Of the fixed contacts of the second power supply switch 10B, a second power-source-side fixed contact P1B which is a contact connected to the power source B and a another path side fixed contact P3 which is a contact connected to the power supply destinations D are provided on the another path R2.

Next, the power supply switch, that is, the first power supply switch 10A and the second power supply switch 10B, will be described in more detail.

The power supply switches 10A and 10B switch the plural paths R1 and R2 to connected states or disconnected states by means of the fixed contacts P1A, P1B, P2, and P3 and the movable contacts 12A and 12B all of which are provided on the plural paths R1 and R2 which serve to supply power from the power source B.

As for the fixed contacts P1A, P1B, P2, and P3, the first power-source-side fixed contact P1A and the second power-source-side fixed contact P1B which connect to the power source B, the electricity-storage-element-side fixed contact P2 which connects to the electricity storage element C, and the another path side fixed contact P3 which is connected to the power supply destinations D by the another path R2 which is separate from the electricity storage path R1 are provided separately, that is, independently of each other. When the power supply switches 10A and 10B are switched to disconnected states, the electricity storage path R1 and the another path R2 are disconnected from each other, whereby no current is allowed to flow from the electricity storage element C to the another path R2.

The movable contacts 12A and 12B are a first movable contact 12A for connecting or disconnecting the first power-source-side fixed contact P1A and the electricity-storage-element-side fixed contact P2 to or from each other and a second movable contact 12B for connecting or disconnecting the second power-source-side fixed contact P1B and the another path side fixed contact P3 to or from each other.

The first power supply switch 10A is a switch for switching the electricity storage path R1 to a connected state or a disconnected state by means of the first power-source-side fixed contact P1A, the electricity-storage-element-side fixed contact P2, and the first movable contact 12A.

The first power supply switch 10A has the first power-source-side fixed contact P1A, the electricity-storage-element-side fixed contact P2, the switch manipulation body 11 which is a body of a switching manipulation receiving unit, and the first movable contact 12A to be connected to the first power-source-side fixed contact P1A and the electricity-storage-element-side fixed contact P2.

The switch manipulation body 11 is made of an insulating material such as a synthetic resin, assumes, as a whole, a block shape that is approximately like a rectangular parallelepiped, and holds the first movable contact 12A inside in such a manner that it can be connected to the power-source-side fixed contact P1A and the electricity-storage-element-side fixed contact P2.

The first movable contact 12A is a conductive, plate-like member called a busbar and, as shown in FIG. 2, is disposed in a switch holding member 111 in such a manner that its width direction coincides with the arrangement direction of the first power-source-side fixed contact P1A and the electricity-storage-element-side fixed contact P2 which are aligned straightly in the electricity storage path R1.

The switch manipulation body 11 is held by the switch holding member 111 which is provided in a housing unit 110 (which houses electric/electronic components) of the electric connection box 100.

The switch holding member 111, which is a member that projects like a hood from the housing unit 110, has, at the projection tip, an inlet opening 111a through which the switch manipulation body 11 is inserted and is configured so as to be able to hold the switch manipulation body 11 that is inserted inward through the inlet opening 111a at both positions corresponding to a connected state and a disconnected state.

Each of the first power-source-side fixed contact P1A and the electricity-storage-element-side fixed contact P2 is shaped like a tuning fork so as to have a nipping portion C1 as a portion to be connected to the first movable contact 12A. The nipping portion C1 is directed to the inlet opening 111a of the switch holding member 111.

When the switch manipulation body 11 is pushed into the switch holding member 111, the first movable contact 12A is nipped by the nipping portions C1 of the first power-source-side fixed contact P1A and the electricity-storage-element-side fixed contact P2, whereby the thus-configured first power supply switch 10A is rendered into a connected state (see FIG. 2). That is, the first power supply switch 10A is switched to a connected state by push-manipulating the switch manipulation body 11.

On the other hand, the switch manipulation body 11 of the first power supply switch 10A being in a connected state is pulled outward, the first movable contact 12A is released from the first power-source-side fixed contact P1A and the electricity-storage-element-side fixed contact P2, whereby the first power supply switch 10A is rendered into a disconnected state (see FIG. 5). That is, the first power supply switch 10A is switched to a disconnected state by pull-manipulating the switch manipulation body 11.

The second movable contact 12B is a switch for switching the another path R2 to a connected state or a disconnected state by means of the second power-source-side fixed contact P1B, the another path side fixed contact P3, and the second movable contact 12B.

The second power supply switch 10B has the same structure as the first power supply switch 10A, and hence a specific description of its structure will be omitted.

Each of the first power supply switch 10A and the second power supply switch 10B of the power feeding circuit 1 is switched to a disconnected state, for example, a time during delivery from an automobile manufacturing factory to a sales store. As a result, the electricity storage path R1 and the another path R2 are disconnected from each other and a current flow from the electricity storage element C to the another path R2 is shut off.

When switched to disconnected states, the power supply switches 10A and 10B according to the first embodiment of the invention can shut off current flows from the power source B to the plural paths R1 and R2, respectively. Furthermore, since the electricity storage path R1 and the another path R2 are disconnected from each other to shut off a current flow from the electricity storage element C to the another path R2, a power loss due to dark currents can be reduced.

When the first movable contact 12A and the second movable contact 12B are switched to disconnected states, the power supply switches 10A and 10B according to the first embodiment of the invention can shut off current flows from the power source B to the plural paths R1 and R2, respectively. Furthermore, since the electricity storage path R1 and the another path R2 are disconnected from each other to shut off a current flow from the electricity storage element C to the another path R2, a power loss due to dark currents can be reduced.

When the first power supply switch 10A and the second power supply switch 10B as the power supply switch are switched to disconnected states, the power feeding circuit 1 according to the first embodiment of the invention can shut off current flows from the power source B to the plural paths R1 and R2, respectively. Furthermore, since the electricity storage path R1 and the another path R2 are disconnected from each other to shut off a current flow from the electricity storage element C to the another path R2, a power loss due to dark currents can be reduced.

Incorporating the power supply switches 10A and 10B and the power feeding circuit 1, the electric connection box 100 according to the first embodiment of the invention can provide the same advantages as the power supply switches 10A and 10B and the power feeding circuit 1.

Modifications

Next, modifications of the power supply switches 10A and 10B, the power feeding circuit 1, and the electric connection box 100 according to the first embodiment of the invention will be described with reference to FIG. 6.

Figure 6:
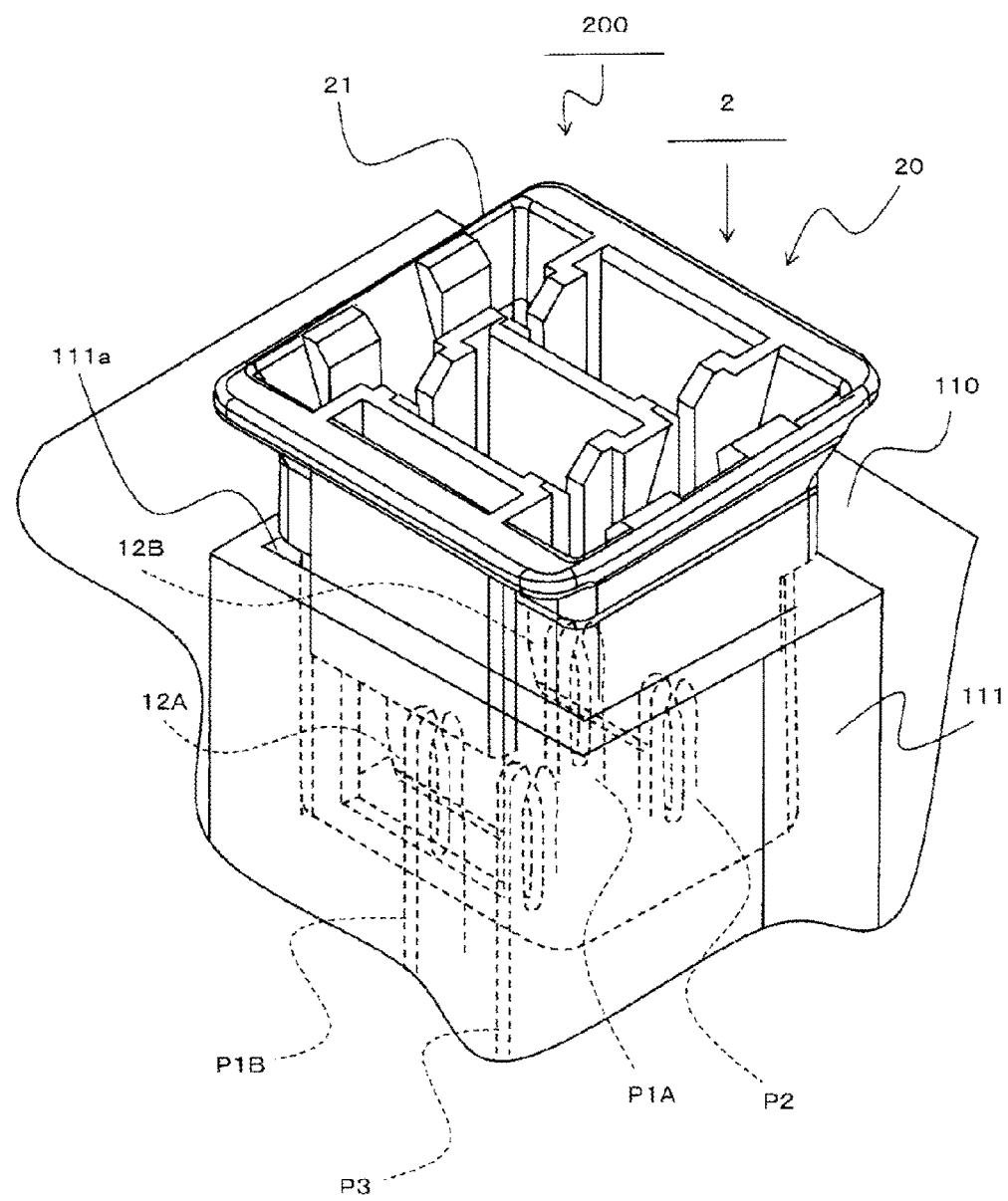
FIG. 6 is an enlarged perspective view of a power supply switch and its neighborhood of a modified electric connection box.

FIG. 6 is an enlarged perspective view of a power supply switch 20 and its neighborhood of a modified electric connection box 200.

The modified power supply switch 20, power feeding circuit 2, and electric connection box 200 are different from the power feeding circuit 1 and the electric connection box 100 according to the first embodiment of the invention in that the first movable contact 12A and the second movable contact 12B are provided in the single power supply switch 20.

The modifications are configured in the same manners as the first embodiment in the other points, and constituent elements having the same ones in the first embodiment are given the same symbols as the latter.

In the power supply switch 20, the first movable contact 12A and the second movable contact 12B are provided in a single switch manipulation body 21.

In addition to providing the same advantages as the power supply switches 10A and 10B according to the first embodiment, the modified power supply switch 20 in which the two movable contacts 12A and 12B are provided in the single switch manipulation body 21 can facilitates a switching manipulation on the power supply switch 20 because the single power supply switch 20 can perform, simultaneously, switching of the electricity storage path R1 to a connected state or a disconnected state by means of the first power-source-side fixed contact P1A, the electricity-storage-element-side fixed contact P2, and the first movable contact 12A and switching of the another path R2 to a connected state or a disconnected state by means of the second power-source-side fixed contact P1B, the another path side fixed contact P3, and the second movable contact 12B.

In addition to providing the same advantages as the power feeding circuit 1 according to the first embodiment, the modified power feeding circuit 2 in which the two movable contacts 12A and 12B are provided in the single switch manipulation body 21 can facilitates a switching manipulation on the power supply switch 20 because the single power supply switch 20 can perform, simultaneously, switching of the electricity storage path R1 to a connected state or a disconnected state by means of the first power-source-side fixed contact P1A, the electricity-storage-element-side fixed contact P2, and the first movable contact 12A and switching of the another path R2 to a connected state or a disconnected state by means of the second power-source-side fixed contact P1B, the another path side fixed contact P3, and the second movable contact 12B.

Although in the power supply switches 10A and 10B, the power feeding circuit 1, and the electric connection box 100 according to the first embodiment and the modified power supply switch 20, power feeding circuit 2, and electric connection box 200 each of the movable contacts 12A and 12B is a conductive plate-like member, another kind of thing, such as a fuse, may be used as long as it can connect and disconnect two contacts electrically.

Embodiment 2

Next, a power supply switch 30, a power feeding circuit 3, and an electric connection box 300 according to a second embodiment of the invention will be described with reference to FIGS. 7-10.

Figure 7:
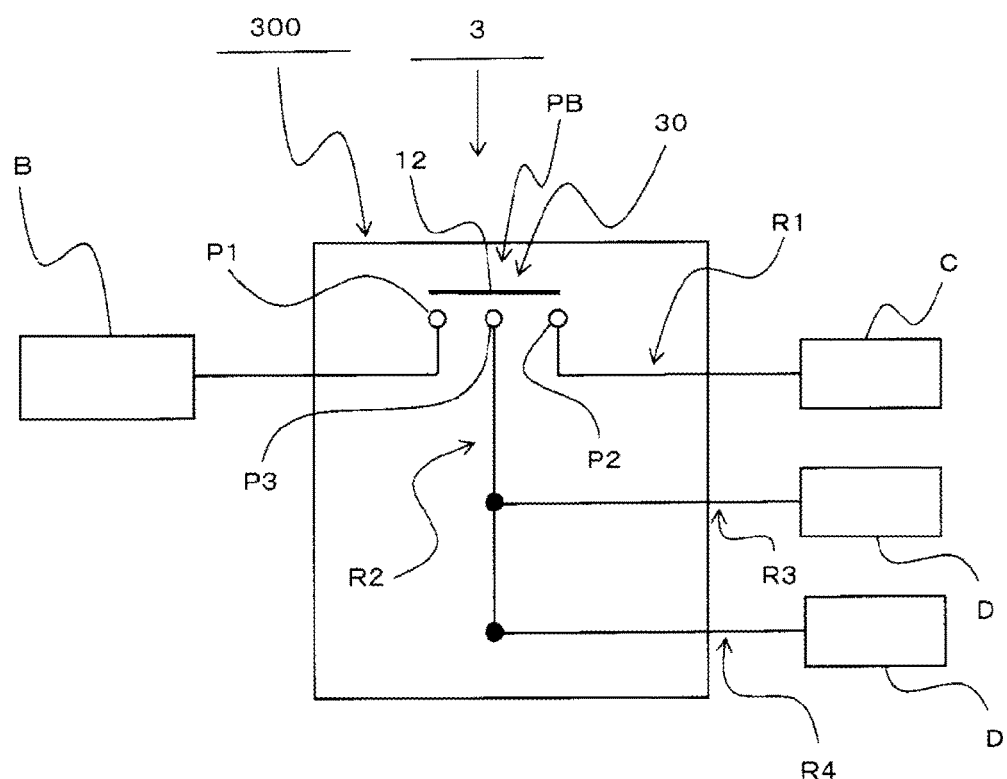
FIG. 7 illustrates a circuit diagram of a power feeding circuit having a power supply switch according to a second embodiment of the invention, power supply destinations, and an electric connection box incorporating the power feeding circuit.
Figure 8:
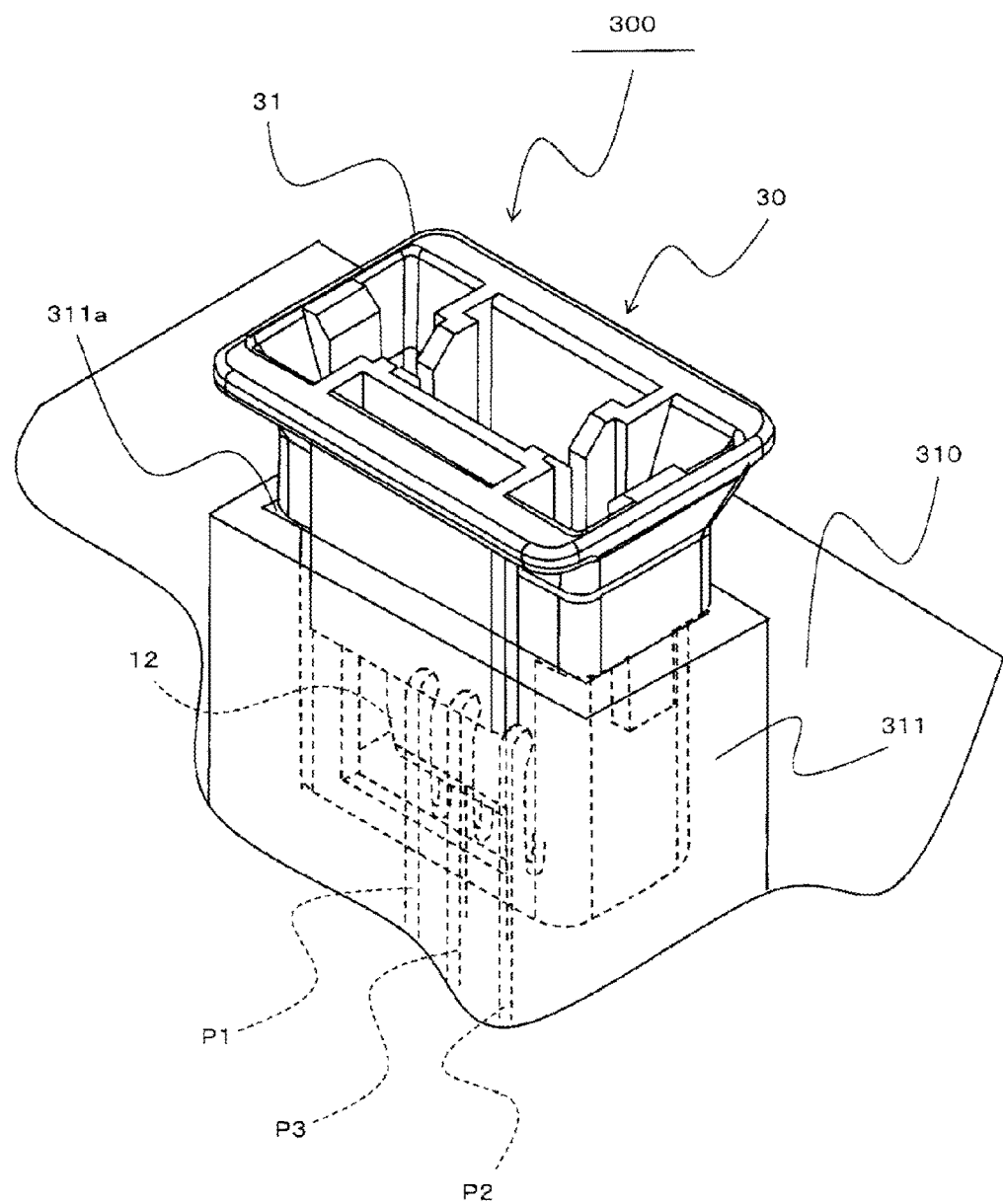
FIG. 8 is an enlarged perspective view of the power supply switch of the electric connection box shown in FIG. 7 and its neighborhood in which the power supply switch is switched to a connected state.
Figure 9:
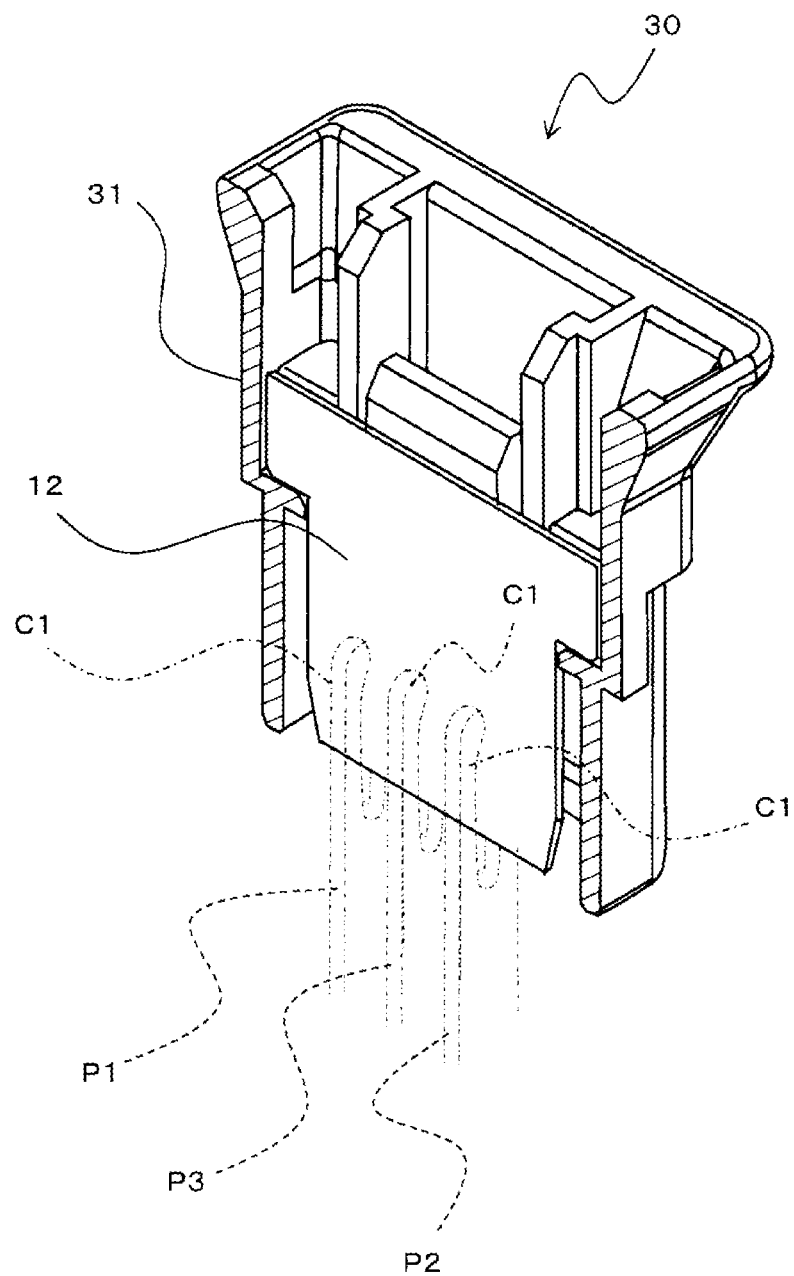
FIG. 9 is a sectional view of a switch manipulation body which incorporates a movable contact and in which a power-source-side fixed contact, an electricity-storage-element-side fixed contact, and an another path side fixed contact are indicated by imaginary lines.
Figure 10:
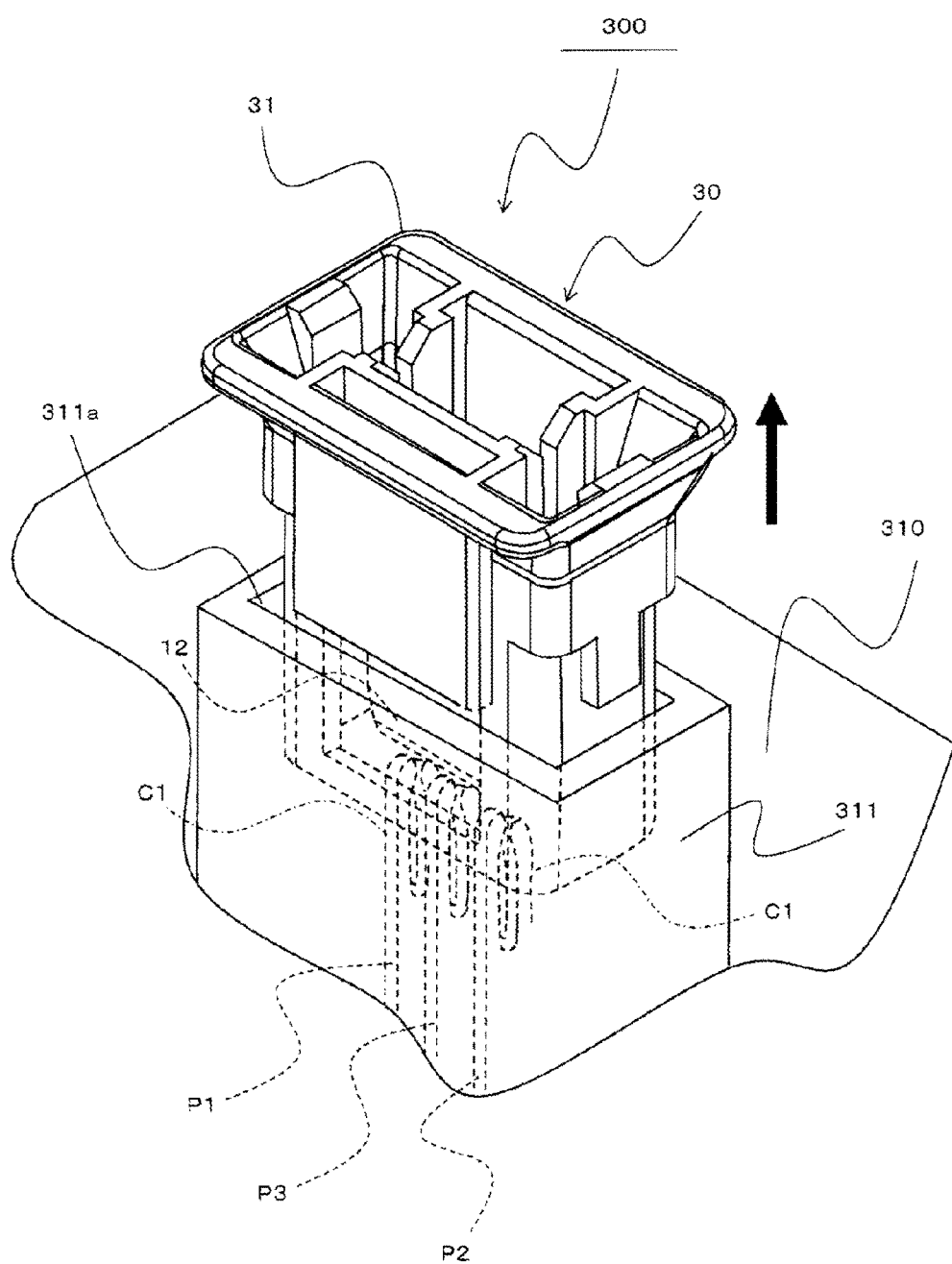
FIG. 10 is an enlarged perspective view of the power supply switch of the electric connection box shown in FIG. 7 and its neighborhood in which the power supply switch is switched to a disconnected state.
Figure 11:
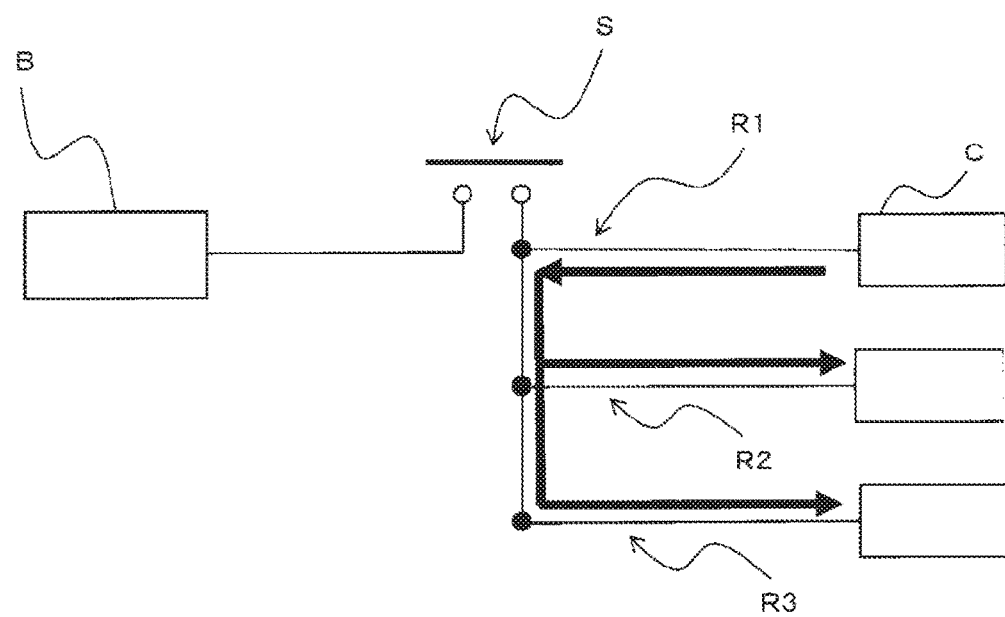
FIG. 11 illustrates a related technique.

FIG. 7 includes a circuit diagram of the power feeding circuit 3 having a power supply switch 30 according to the second embodiment of the invention and schematically shows power supply destinations D and an electric connection box 300 incorporating the power feeding circuit 3. FIG. 8 is an enlarged perspective view of the power supply switch 30 of the electric connection box 300 shown in FIG. 7 and its neighborhood in which the power supply switch 30 is switched to a connected state. FIG. 9 is a sectional view of a switch manipulation body 31 which incorporates a movable contact 12 and in which a power-source-side fixed contact P1, an electricity-storage-element-side fixed contact P2, and a another path side fixed contact P3 are indicated by imaginary lines. FIG. 10 is an enlarged perspective view of the power supply switch 30 of the electric connection box 300 shown in FIG. 7 and its neighborhood in which the power supply switch 10A is switched to a disconnected state.

The power feeding circuit 3 and the electric connection box 300 according to the second embodiment of the invention are different from the power feeding circuits 1 and 2 and the electric connection boxes 100 and 200 according to the first embodiment in that the number of fixed contacts that are connected to the power source B is reduced from two to one and the electricity storage path R1 and the another path R2 are switched to connected states or disconnected states simultaneously by the single power supply switch 30.

The second embodiment is configured in the same manners as the first embodiment in the other points, and constituent elements having the same ones in the first embodiment are given the same symbols as the latter.

The power feeding circuit 3 has the power supply switch 30 for switching plural paths R1 and R2 for supply of power from the power source B such as a battery to connected states or a disconnected states.

The power feeding circuit 1 has the plural paths R1 and R2 for supply of power from the power source B, and one of the plural paths R1 and R2 is an electricity storage path R1 that connects to an electricity storage element C which serves for power storage.

More specifically, in the power feeding circuit 3, the electricity storage path R1 and the path R2 (hereinafter referred to as an another path R2) other than the electricity storage path R1 branch off downstream of the power source B, that is, in the power supply switch 30.

Among fixed contacts of the power supply switch 30, an electricity-storage-element-side fixed contact P2 which is a contact connected to the electricity storage element C is provided on the electricity storage path R1.

On the other hand, the another path R2 connects to two power supply destinations D. That is, the another path R2 branches off downstream of the power supply switch 30 into a first path R3 and a second path R4.

Among the fixed contacts of the power supply switch 30, a another path side fixed contact P3 which is a contact connected to the power supply destinations D is provided on the another path R2.

Next, the power supply switch 30 will be described in more detail.

The power supply switch 30 switches the plural paths R1 and R2 to connected states or disconnected states by means of the fixed contacts P1, P2, and P3 and the movable contact 12 all of which are provided on the plural paths R1 and R2 which serve to supply power from the power source B.

As for the fixed contacts P1, P2, and P3, the power-source-side fixed contact P1 which connects to the power source B, the electricity-storage-element-side fixed contact P2 which connects to the electricity storage element C, and the another path side fixed contact P3 which is connected to the power supply destinations D by the another path R2 which is separate from the electricity storage path R1 are provided separately, that is, independently of each other. When the power supply switch 30 is switched to a disconnected state, the electricity storage path R1 and the another path R2 are disconnected from each other, whereby no current is allowed to flow from the electricity storage element C to the another path R2.

The power supply switch 30 has the power-source-side fixed contact P1, the electricity-storage-element-side fixed contact P2, the another path side fixed contact P3, the switch manipulation body 31 which is a body of a switching manipulation receiving unit, and the movable contact 12 to be connected to the power-source-side fixed contact P1, the electricity-storage-element-side fixed contact P2, and the another path side fixed contact P3.

The power-source-side fixed contact P1, the electricity-storage-element-side fixed contact P2, and the another path side fixed contact P3 are concentrated at a branching point PB of the electricity storage path R1 and the another path R2.

The power-source-side fixed contact P1, the electricity-storage-element-side fixed contact P2, and the another path side fixed contact P3 are aligned straightly.

The switch manipulation body 31 is made of an insulating material such as a synthetic resin, assumes, as a whole, a block shape that is approximately like a rectangular parallelepiped, and holds the movable contact 12 inside in such a manner that it can be connected to the power-source-side fixed contact P1, the electricity-storage-element-side fixed contact P2, and the another path side fixed contact P3.

The movable contact 12 is formed so that the single movable contact 12 serves to render the power-source-side fixed contact P1, the electricity-storage-element-side fixed contact P2, and the another path side fixed contact P3 in connected states to or disconnected states.

The movable contact 12 is a conductive, plate-like member called a busbar and, as shown in FIG. 8, is disposed in a switch holding member 311 so as to extend in the arrangement direction of the power-source-side fixed contact P1, the electricity-storage-element-side fixed contact P2, and the another path side fixed contact P3 which are aligned straightly.

As such, the movable contact 12, having a simple, straight structure, can be connected to or disconnected from the power-source-side fixed contact P1, the electricity-storage-element-side fixed contact P2, and the another path side fixed contact P3 simultaneously.

The switch manipulation body 31 is held by the switch holding member 311 which is provided in a housing unit 310 (which houses electric/electronic components) of the electric connection box 300.

The switch holding member 311, which is a member that projects like a hood from the housing unit 310, has, at the projection tip, an inlet opening 311a through which the switch manipulation body 31 is inserted and is configured so as to be able to hold the switch manipulation body 31 that is inserted inward through the inlet opening 311a at both positions corresponding to a connected state and a disconnected state.

Each of the power-source-side fixed contact P1, the electricity-storage-element-side fixed contact P2, the another path side fixed contact P3 is shaped like a tuning fork so as to have a nipping portion C1 as a portion to be connected to the movable contact 12. The nipping portion C1 is directed to the inlet opening 311a of the switch holding member 311.

When the switch manipulation body 31 is pushed into the switch holding member 311, the movable contact 12 is nipped by the nipping portion C1 of the power-source-side fixed contact P1, the electricity-storage-element-side fixed contact P2, and the another path side fixed contact P3, whereby the thus-configured power supply switch 30 is rendered into a connected state (see FIG. 8). That is, the power supply switch 30 is switched to a connected state by push-manipulating it.

On the other hand, the switch manipulation body 31 of the power supply switch 30 being in a connected state is pulled outward, the movable contact 12 is released from the power-source-side fixed contact P1, the electricity-storage-element-side fixed contact P2, and the another path side fixed contact P3, whereby the power supply switch 30 is rendered into a disconnected state (see FIG. 10). That is, the power supply switch 30 is switched to a disconnected state by pull-manipulating its switch manipulation body 31.

The power supply switch 30 of the power feeding circuit 3 is switched to a disconnected state, for example, a time during delivery from an automobile manufacturing factory to a sales store. As a result, the electricity storage path R1 and the another path R2 are disconnected from each other and a current flow from the electricity storage element C to the another path R2 is shut off.

When switched to a disconnected state, the power supply switch 30 according to the second embodiment of the invention can shut off current flows from the power source B to the plural paths R1 and R2. Furthermore, since the electricity storage path R1 and the another path R2 which is different from the electricity storage path R1 are disconnected from each other to shut off a current flow from the electricity storage element C to the another path R2, a power loss due to dark currents can be reduced.

In the power supply switch 30 according to the second embodiment of the invention, since the single power supply switch 30 can render the electricity storage path R1 and the another path R2 into connected states or disconnected states simultaneously, a switching manipulation on the power supply switch 30 can be performed easily. Furthermore, the power-source-side fixed contact P1, the electricity-storage-element-side fixed contact P2, and the another path side fixed contact P3 can be arranged in a concentrated manner, the power supply switch 30 can be miniaturized.

In the power supply switch 30 according to the second embodiment of the invention, the power-source-side fixed contact P1, the electricity-storage-element-side fixed contact P2, and the another path side fixed contact P3 are aligned straightly, whereby the movable contact 12 is made straight and can be connected to all of these three contacts. Thus, the power supply switch 30 is given a simple structure.

When the power supply switch 30 is switched to a disconnected state, the power feeding circuit 3 according to the second embodiment of the invention can shut off current flows from the power source B to the plural paths R1 and R2. Furthermore, since the electricity storage path R1 and the another path R2 are disconnected from each other to shut off a current flow from the electricity storage element C to the another path R2, a power loss due to dark currents can be reduced as in the power feeding circuit 1 according to the first embodiment.

Incorporating the power supply switch 30 and the power feeding circuit 3, the electric connection box 300 according to the second embodiment of the invention can provide the same advantages as the power supply switch 30 and the power feeding circuit 3.

Although the power supply switch 30 according to the second embodiment of the invention has the three fixed contacts P1, P2, and P3, the invention is not limited to such a case. The number of fixed contacts may be adjusted as appropriate according to the number of branch paths at the branching point PB and may be larger than three.

Although in the power feeding circuits 1, 2, and 3 according to the first embodiment and the second embodiment of the invention one of the plural paths is the electricity storage path R1, power feeding circuits are possible that have plural electricity storage paths R1.

Although the power supply switches 10, 20, and 30 and the power feeding circuits 1, 2, and 3 according to the first embodiment and the second embodiment of the invention are incorporated in the electric connection boxes 100, 200, and 300, respectively, the invention is not limited to such a case; they may be incorporated in respective devices of another kind.

Although the invention made by the present inventors has been described above in a specific manner based on the embodiments of the invention, the invention is not limited to the embodiments of the invention and various modifications are possible without departing from the spirit and scope of the invention.

What is claimed is:

1. A power supply switch comprising:
   fixed contacts provided on plural paths for supply of power from a power source; and
   a movable contact which switches the plural paths to a connected state or a disconnected state,
   wherein at least one of the plural paths is an electricity storage path which connects to an electricity storage element which stores power;
   wherein the fixed contacts include a power-source-side fixed contact which connects to the power source, an electricity-storage-element-side fixed contact which connects to the electricity storage element, and an another path side fixed contact which connects to another path of the plural paths, and the power-source-side fixed contact, the electricity-storage-element-side fixed contact, and the another path side fixed contact are provided so as to be separate from and independent to each other, and the another path is different from the electricity storage path; and
   wherein when the plural paths are switched to the disconnected state by the movable contact, the electricity storage path and the another path are disconnected from each other and a current flow from the electricity storage element to the another path is thereby shut off.

2. The power supply switch according to claim 1, wherein the power-source-side fixed contact, the electricity-storage-element-side fixed contact, and the another path side fixed contact are provided in a concentrated manner at a branching point of the electricity storage path and the another path;
   wherein the movable contact is a single movable contact; and
   wherein the single movable contact connects or disconnects the power-source-side fixed contact, the electricity-storage-element-side fixed contact, and the another path side fixed contact to or from each other.

3. The power supply switch according to claim 2, wherein the power-source-side fixed contact, the electricity-storage-element-side fixed contact, and the another path side fixed contact are aligned in a line; and
   wherein the movable contact has a straight shape.

4. A power feeding circuit which comprises the power supply switch according to claim 1 and switches plural paths for supply of power from a power source to connected states or disconnected states.

5. An electric connection box which comprises the power feeding circuit according to claim 4 and distributes the power from the power source to plural power supply destinations.

6. An electric connection box which comprises the power supply switch according to claim 1 and distributes power from a power source to plural power supply destinations.

7. A power supply switch comprising:
fixed contacts provided on plural paths for supply of power from a power source; and
a movable contact which switches the plural paths to a connected state or a disconnected state;
wherein at least one of the plural paths is an electricity storage path which connects to an electricity storage element which stores power;
wherein the fixed contacts include a power-source-side fixed contact which connects to the power source, an electricity-storage-element-side fixed contact which connects to the electricity storage element, and an another path side fixed contact which connects to another path of the plural paths, and the power-source-side fixed contact, the electricity-storage-element-side fixed contact, and the another path side fixed contact are provided so as to be separate from and independent to each other, and the another path is different from the electricity storage path;
wherein when the plural paths are switched to the disconnected state by the movable contact, the electricity storage path and the another path are disconnected from each other and a current flow from the electricity storage element to the another path is thereby shut off;
wherein the power-source-side fixed contact is provided downstream of a branching point of the electricity storage path and the another path;
wherein the power-source-side fixed contact comprises:
a first power-source-side fixed contact provided on the electricity storage path; and
a second power-source-side fixed contact provided on the another path; and
wherein the movable contact comprises:
a first movable contact which connects or disconnects the first power-source-side fixed contact and the electricity-storage-element-side fixed contact to or from each other; and
a second movable contact which connects or disconnects the second power-source-side fixed contact and the another path side fixed contact to or from each other.

8. The power supply switch according to claim 7, wherein the first movable contact and the second movable contact are provided in a single switch manipulation body.

* * * * *